United States Patent [19]
Leung et al.

[11] Patent Number: 5,864,763
[45] Date of Patent: Jan. 26, 1999

[54] DIGITAL WIRELESS TELEPHONE SYSTEM INTERFACE FOR ANALOG TELECOMMUNICATIONS EQUIPMENT

[76] Inventors: Nikolai K. N. Leung, 5281 Setting Sun Way, San Diego, Calif. 92121; Juan Faus, 9545 Laurentian Dr., San Diego, Calif. 92129; Matthew S. Grob, 2757 Bordeaux Ave., La Jolla, Calif. 92037; Johnny K. John, 8867 Pipestone Way, San Diego, Calif. 92129

[21] Appl. No.: 719,112

[22] Filed: Sep. 24, 1996

[51] Int. Cl.$^6$ .............................. H04M 11/06; H04Q 7/32
[52] U.S. Cl. ..................... 455/557; 455/74.1; 455/556; 379/100.13; 379/100.15; 358/425; 370/342
[58] Field of Search .................. 455/422, 74, 74.1, 455/552, 556, 557; 379/100.01, 100.09, 100.13, 100.15; 358/425, 434; 370/335, 342

[56] References Cited

U.S. PATENT DOCUMENTS 5,187,591   2/1993   Guy et al. ............................... 358/425

FOREIGN PATENT DOCUMENTS 2268368   5/1994   United Kingdom ................... 455/100

OTHER PUBLICATIONS

"Recommendation V.21" CCITT, pp. 65–69.

*Primary Examiner*—Willis R. Wolfe
*Assistant Examiner*—Hieu T. Vo
*Attorney, Agent, or Firm*—Russell B. Miller; Brian S. Edmonston; Thomas R. Rouse

[57] ABSTRACT

A novel and improved method and apparatus for providing an interface to a digital wireless telephone system compatible with standard analog wire line telephones, analog wire line fax machines, and computer modems is described. At the start of a telephone call, a data pump interprets the digits dialed, and if a first set of digits are received a control system configures the data pump for processing analog fax data. If a second set of digits are received, the control system configures the data pump for processing analog computer modem data. If a telephone number is received, the control system configures the interface system to pass additional data to a vocoder which encodes any digitized audio information received.

13 Claims, 3 Drawing Sheets

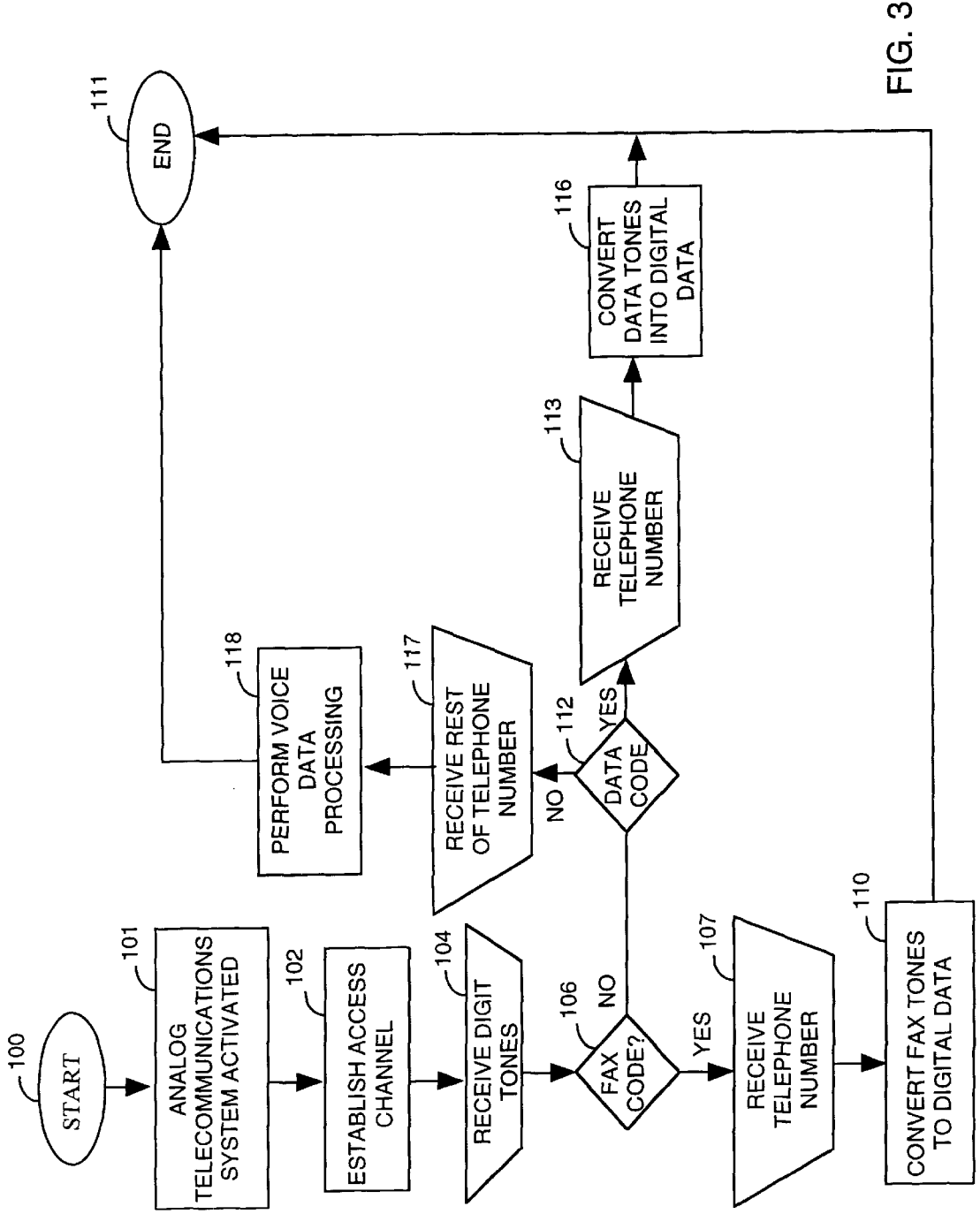

5,864,763

DIGITAL WIRELESS TELEPHONE SYSTEM INTERFACE FOR ANALOG TELECOMMUNICATIONS EQUIPMENT

BACKGROUND OF THE INVENTION

I. Field of the Invention

The present invention relates to an interface for a digital wireless telephone system. More particularly, the present invention relates to an interface for a digital wireless telephone system that is compatible with standard analog telephones, analog fax machines, and computer modems.

II. Description of the Related Art

Digital wireless telephone systems allow information to be exchanged more efficiently than analog wireless telephone systems. This increased efficiency allows a greater number of telephone calls or other communications to be conducted over digital wireless telephone systems using a given amount of radio frequency (RF) bandwidth. A prominent example of an analog wireless telephone system is the AMPS cellular telephone system employed extensively throughout the United States.

In some instances, the increased efficiency provided by digital wireless telephone systems is so substantial that digital wireless telephone service becomes economically competitive with the traditional analog wire line telephone service. Analog wire line telephone service is the telephone service provided using the conventional wire based telephone system, often referred to as the public switched telephone network (PSTN). Analog wireline telephone systems typically process data in analog format directly, or in a digital representation of the analog data referred to as pulse code modulated (PCM) format. Analog wire line telephone service has traditionally been far less expensive than wireless telephone service.

To provide a complete replacement for traditional analog wire line telephone service, wireless digital telephone systems must be able to accommodate all the services and functions that are currently supported by analog wire line telephone service. These services include fax and computer data transmission.

Although digital wireless telephone systems typically do provide fax and digital data transmission service, the interface to the fax and data service is generally different than that of analog telephone systems. In particular, digital wireless telephone systems process the digital data directly, rather than in the form of tones, as practiced for analog communication systems.

Because of the different interface methods, some analog telecommunication equipment can not be used with the digital wireless telephone systems. In particular, fax machines and computer modems designed for use with an analog telephone system typically cannot be used with a digital wireless telephone system. Therefore, a user converting from analog wire based telephone service to digital wireless telephone service will have to consider the capital investment made in such equipment when determining the cost benefit of switching to digital wireless telephone service.

Therefore, to reduce the cost of transitioning from wire based telephone service to a digital wireless telephone service, it is desirable to provide interface to a digital wireless telephone system that works with analog based wire line telecommunication equipment. In particular, it would be desirable to provide an interface to a digital wireless telephone system that works with standard telephones, fax machines, and computer modems.

SUMMARY OF THE INVENTION

The present invention is a novel and improved method and apparatus for providing an interface to a digital wireless telephone system compatible with standard analog wire line telephones, analog wire line fax machines, and computer modems. At the start of a telephone call, a data pump interprets the digits dialed, and if a first set of digits are received a control system configures the data pump for processing analog fax data. If a second set of digits are received, the control system configures the data pump for processing analog computer modem data. If a telephone number is received, the control system configures the interface system to pass additional data to a vocoder which encodes any digitized audio information received.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 3 is a flow chart illustrating the operation of the digital wireless telecommunications system when configured in accordance with one embodiment of the invention.

DETAILED DESCRIPTION OF THE PREFERRED EMBODIMENTS

Figure 1:
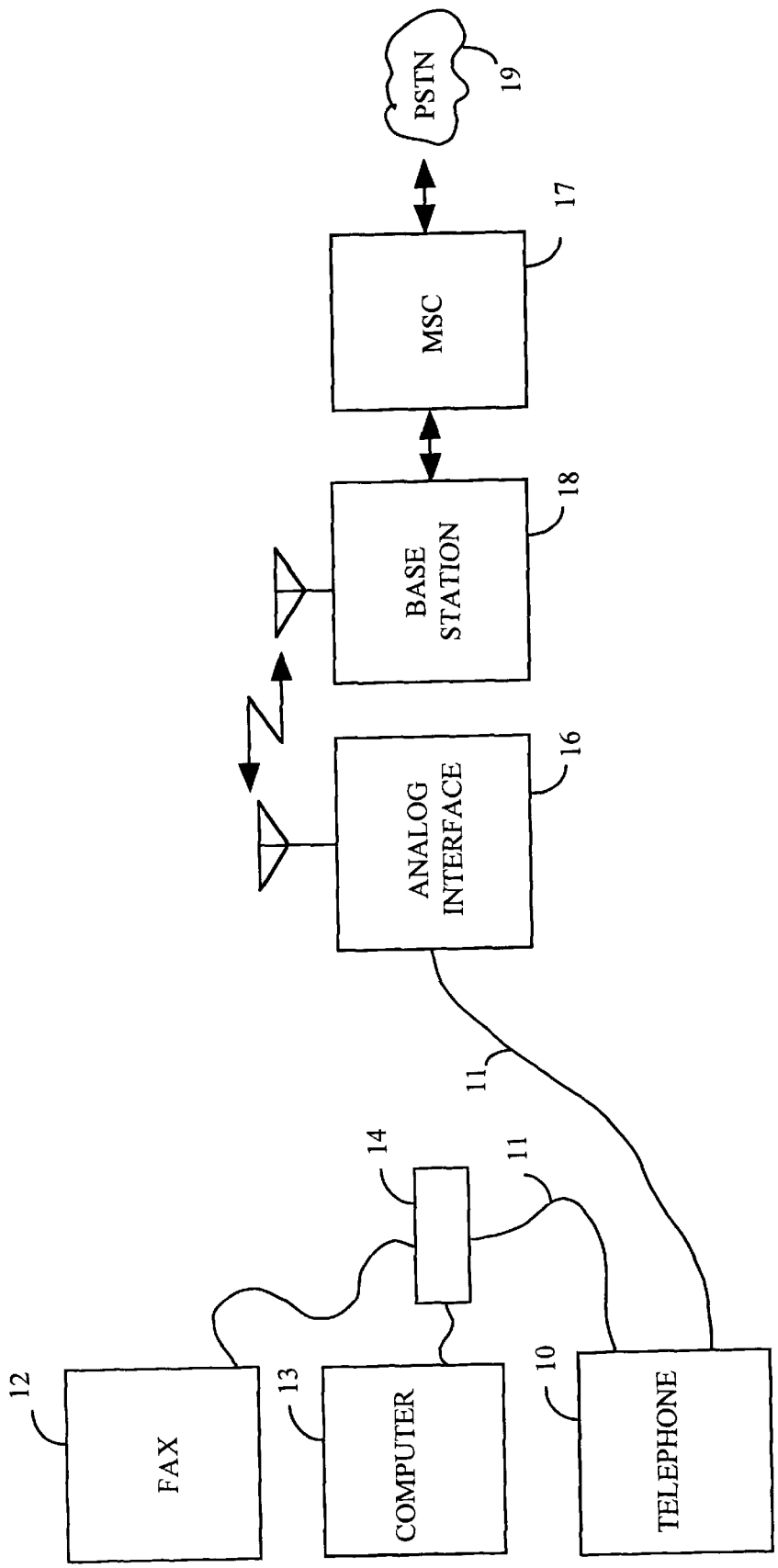
FIG. 1 is an illustration of a telephone, fax and computer modem coupled to the interface in accordance with one embodiment of the invention.

FIG. 1 is an illustration of a telephone 10, fax 12, and computer modem 14 coupled in daisy chain fashion by line 11 to analog interface 16 in accordance with one embodiment of the invention. Telephone 10, fax 12, computer modem 14 are referred to collectively as "analog telecommunications systems" and are configured to operate with analog telephone systems such as the public switched telephone network (PSTN). Analog interface 16 exchanges RF signals with base station 18 which interfaces with the public switched telephone network (PSTN) 19 by way of mobile switching center (MSC) 17.

To conduct a telephone call, an analog communication system is activated, and a telephone number dialed via a keypad or via another input method such as commands from computer 13. Activation is typically performed by lifting a handset from a cradle, or via an activation button (not shown).

Analog interface 16 detects the activation as a voltage change along line 11, and establishes an access channel to base station 18 via the use of RF signals. Additionally, analog interface 16 receives dialed digits from the analog telecommunication system in the form of analog digit tones. In one embodiment of the invention, the tones from the analog telecommunication system are provided in analog format. The analog digit tones are interpreted and converted into digital numbers that are transmitted to MSC 17 via the access channel and base station 18.

In an alternative embodiment of the invention, the tones from the analog communication system are provided in pulse code modulated (PCM) format. One example of a PCM based analog communication system is some types of PBX telephones, the use of which is well known in the art.

Analog interface 16 interprets the PCM digit tones and similarly converts them into digital numbers that are transmitted to MSC 17 via the access channel and base station 18.

MSC 17 monitors the digital numbers and determines if a fax code or data code has been entered. In the preferred embodiment of the invention, the fax or data code must be entered before the telephone number, and must be defined such that the fax and data code are easily distinguishable from the telephone number. In one embodiment of the invention, the fax and data code are made distinguishable by requiring the fax and data codes to begin with the star key (*) commonly found on most analog telephone systems, followed by a predetermined number of digits. For example, the fax code could be set to *01 and the data code to *02.

Additionally, using a telephone exchange database (not shown), MSC 17 determines when a complete telephone number has been dialed, and initiates a telephone call by forwarding the number to PSTN 19. Additionally, MSC 17 establishes an internal channel for conducting the telephone call or other communications.

When MSC 17 determines that a complete telephone number has been dialed, it causes a bidirectional interface to be established between base station 18 and analog interface 16, and routes the call through the PSTN 19 using the telephone number. The bidirectional interface is comprised of a forward link traffic channel and a reverse link traffic channel. Using the bidirectional interface, MSC 17 signals analog interface 16 as to the call type (voice, data or fax) based on whether a fax or data code was received, or if no code was received. The use of a voice code for indicating that a voice call is to be conducted is consistent with the operation of the invention, although generally not preferred.

Upon receipt of the call type, analog interface 16 configures itself for processing the corresponding analog data. In particular, analog interface 16 configures itself to convert computer modem tones into digital data, fax tones into digital data, or speech into digital data. The resulting digital data is then transmitted via the bidirectional interface to MSC 17 by way of base station 18.

The methods for processing fax tones and data tones are different, but both are well known in the art. Furthermore, various methods for converting audio samples into digital data are well known in the art.

In one embodiment of the invention, the digital data is then reconverted back into analog data within MSC 17 for further transmission via PSTN 19. In particular, the digital data is converted into pulse code modulation (PCM) formatted analog tones.

In an alternative embodiment of the invention, analog interface 16 monitors the digits dialed before transmitting the associated digital numbers to MSC 17 to determine if a fax or data code has been entered and forwards any additional digits to MSC 17.

Once a complete number has been entered, MSC 17 causes a bidirectional interface to be established with analog interface 16 via RF signals exchanged with base station 18. The bidirectional interface is comprised of a forward link traffic channel and a reverse link traffic channel. In response, analog interface 16 configures itself based on which code was detected. If no code was detected, analog interface 16 configures itself for a voice call, although the use of a voice code for indicating that a voice call is to be conducted is consistent with the operation of the invention.

Figure 2:
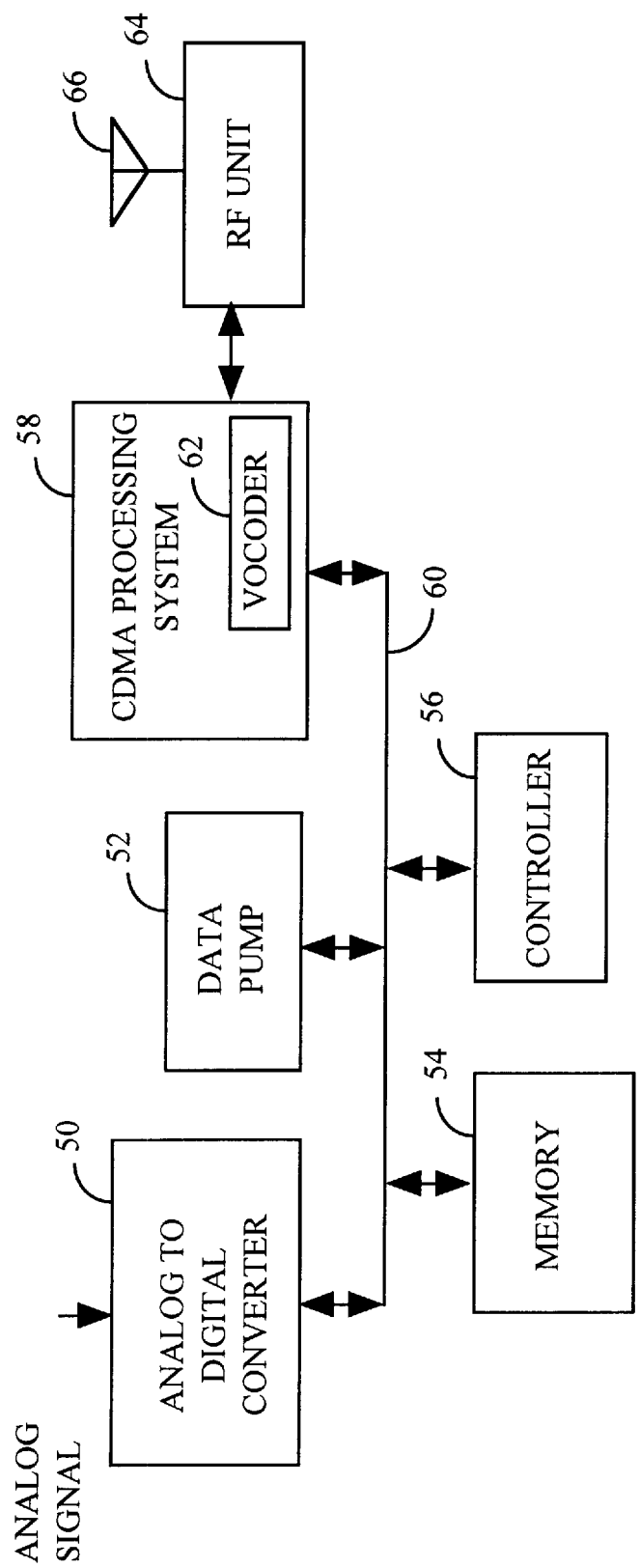
FIG. 2 is a block diagram of the digital wireless telecommunications system when configured in accordance with one embodiment of the invention.

FIG. 2 is a block diagram of analog interface 16 when configured in accordance with one embodiment of the invention. Analog-to-digital converter 50, data pump 52, memory system 54, controller 56, and CDMA processing system 58 are coupled together via data bus 60. Vocoder 62 is located within CDMA processing system 58, and RF unit 64 is coupled to CDMA processing system 58 and antenna system 66.

During a telephone call, analog-to-digital converter 50 first detects activation of an analog telecommunication system of FIG. 2. Once activation is detected, analog-to-digital converter 50 converts analog signals received from the analog telecommunications system into digital samples.

In the embodiment of the invention which allows PCM formatted tones to be processed, a PCM-to-digital converter (not shown) is included along with, or instead of, analog-to-digital converter 50. The PCM-to-digital converter converts the PCM formatted data to digital samples that are received by data pump 52.

Data pump 52 is configured by controller 56 to monitor the digital samples for analog digit tones. In the preferred embodiment of the invention, data pump 52 is comprised of a digital signal processor (DSP) configured and controlled via the use of software stored in memory system 54 which controller 56 causes to be applied to data pump 52 in an orderly fashion. Similarly, in the preferred embodiment of the invention, controller 56 is a microprocessor configured and controlled via the use of software.

When the analog digit tones are received, data pump 52 converts the digital samples of the analog digit tones into digital representations of the dialed digits. The digital representations are forwarded to CDMA processing system 58 which performs CDMA signal processing to convert the digital representations into CDMA signals. RF unit 64 upconverts and transmits the CDMA signals to base station 18 of FIG. 1 via antenna system 66. Base station 18 extracts the digital representations from the CDMA signals, and provides the digital representations to MSC 17.

One method for performing CDMA processing is described in U.S. Pat. No. 5,103,459 entitled "SYSTEM AND METHOD FOR GENERATING SIGNAL WAVEFORMS IN A CDMA CELLULAR TELEPHONE SYSTEM" assigned to the assignee of the present invention and incorporated herein by reference.

As noted above, when a complete number has been dialed, MSC 17 causes a bidirectional interface to be established between base station 18 and analog interface 16. Using that bidirectional interface, MSC 17 indicates to analog interface 16 whether a data call, a fax call, or a voice call is to be conducted.

If a data or fax call is indicated, controller 56 responds by configuring data pump 52 to process either data analog tones or fax analog tones as indicated. As analog samples are received, data pump 52 interprets the analog samples and generates digital data that is forwarded to MSC 17.

If a voice call is being conducted, controller 56 responds by directing the analog samples to vocoder 62 located within CDMA processing system 58. Vocoder 62 performs voice compression and encoding to generate a digital data representation of the voice contained in the analog samples. The digital data is further processed within CDMA processing system 58 and transmitted to MSC 17 via the bidirectional traffic channel interface.

In the alternative embodiment of the invention, controller 56 monitors the digits dialed before they are transmitted to MSC 17 to determine if a fax or data code has been entered. If a fax or data code is detected, all additional digits are then forwarded to MSC 17 and when a bidirectional interface has been established, controller 56 configures data pump 52 to process either fax or data as indicated.

If no code is detected, controller 56 forwards all digits received to MSC 17, and when a bidirectional interface is established, configures CDMA processing system 58 to receive the analog samples and to perform vocoding using vocoder 62.

FIG. 3 is a flow diagram illustrating the processing associated with conducting a telephone call in accordance with one embodiment of the invention. The processing begins at step 100 and after detecting the activation of an analog telecommunication system (telephone 10, fax 12, computer modem 14 of FIG. 1) at step 101, an access channel to the base station 18 is established at step 102.

At step 104 a first set of digits are received, and at step 106 it is determined if the first set of digits are the fax code. If so, once the telephone number is received at step 107, fax tones are converted into digital data at step 110. This fax processing ends at step 111 when the call is complete.

If it is determined at step 106 that the first set of digits were not the fax code, it is then determined at step 112 if the first set of digits were the data code. If so, once the telephone number is received at step 113, data tones are converted into digital data at step 116, and the digital data is transmitted to MSC 17. The data processing ends at step 111 when the call is complete.

If it is determined at step 112 that the data code has not been received, once the rest of the telephone number is received at step 117, voice data processing is performed at step 118. When the call is complete the voice processing is terminated at step 111.

Thus, a method and apparatus for providing an interface to a digital wireless telephone system compatible with a standard analog wire line telephone, an analog wire line fax machine, and a computer modem is described. By using a fax or data code, the proper processing can be used without the need to determine the type of data being transmitted based on the data itself, which would require substantial processing resources. This reduces the complexity and therefore the cost of the analog interface, while still allowing telephone service subscribers to use analog telecommunications equipment with digital wireless telephone systems.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. In particular, while the invention is described in the context of a CDMA wireless telephone system, the use of other digital technologies is consistent with the use of the invention. Thus, the present invention is not intended to be limited to the embodiments shown herein but is to be accorded the widest scope consistent with the principles and novel features disclosed herein.

We claim:

1. A digital wireless telephone system that can be used with analog fax machines, analog computer modems, and analog telephones, comprising:

means for converting tones into digital data; and means, coupled to said means for converting, for configuring said means for converting to convert number tones into digital numbers, to convert fax tones into digital data if a fax indicator is received over the air, and to convert data tones into digital data if a data indicator is received over the air.

2. The digital wireless telephone system as set forth in claim 1 further comprising:

CDMA processing means for receiving said fax indicator and said data indictator, and for transmitting said digital numbers.

3. The digital wireless telephone system as set forth in claim 2 further comprising:

switching center means for transmitting said fax indicator if said digital numbers contains a fax code, and for transmitting said data indicator if said digital numbers contains a data code.

4. The digital wireless telephone system as set forth in claim 1 further comprising a means for converting PCM formatted data into digital samples.

5. An analog interface to a digital wireless telephone system that can be used with analog fax machines, analog computer modems, and analog telephones, comprising:

a data-fax pump for converting digital samples into digital data; and a control system coupled to said data-fax pump for configuring said data-fax pump to convert telephone digits into digital data, to convert data tones into digital data if a data code indicator is received from said digital wireless telephone system, and to convert fax tones into digital data if a fax code indicator is received from said digital wireless telephone system.

6. The analog interface as set forth in claim 5 wherein said control system is further for configuring a vocoder to convert analog audio data into digital data.

7. The analog interface as set forth in claim 5 further comprising:

CDMA processing system for converting said digital data into CDMA signals, and for converting received CDMA signals into received digital data; and RF processing unit for transmitting said CDMA signals and for converting received RF signals into said received CDMA signals.

8. The analog interface as set forth in claim 7 wherein said fax code indicator and said data code indicator are received via said received RF signals.

9. A method for providing an analog interface to a digital wireless telephone system that can be used with analog fax machines, analog computer modems, and analog telephones, comprising the steps of:

a) receiving a set of telephone number digits;

b) determining whether a fax code is received from the digital wireless telephone system with the set of telephone number digits, whether a data code is received from the digital wireless telephone system with the set of telephone number digits, or whether no code is received from the digital wireless telephone system with the set of telephone number digits;

c) performing fax tone processing if a fax code is received; and d) performing data tone processing if a data code is received.

10. The method as set forth in claim 9 further comprising the step of:

e) performing vocoding if no code is received.

11. The method as set forth in claim 9 wherein step c) is comprised of the step of:

converting fax tones into digital data.

12. The method as set forth in claim 9 wherein step d) is comprised of the step of:

converting data tones into digital data.

13. The method as set forth in claim 9 further comprising the step of:

waiting until a complete telephone number is entered before performing steps c) and d).

* * * * *

UNITED STATES PATENT AND TRADEMARK OFFICE
CERTIFICATE OF CORRECTION

PATENT NO. : 5,864,763
DATED : January 26, 1999
INVENTOR(S) : Nikolai K.N. Leung, Juan Faus, Matthew S. Grob, Johnny K. John It is certified that error appears in the above-identified patent and that said Letters Patent is hereby corrected as shown below:

On the title page, item [73] please add

-- Assignee: QUALCOMM Incorporated, San Diego, California --

Signed and Sealed this

Sixth Day of March, 2001

Attest:

NICHOLAS P. GODICI

Attesting Officer    Acting Director of the United States Patent and Trademark Office